United States Patent [19]

Clerc et al.

[11] Patent Number: 4,509,828

[45] Date of Patent: Apr. 9, 1985

[54] MATRIX DISPLAY DEVICE WITH MULTIPLE SCREEN ELECTRODES

[75] Inventors: Jean F. Clerc, Meylan; Jacques Robert, Saint Egreve, both of France

[73] Assignee: Commissariat a l'Energie Atomique, Paris, France

[21] Appl. No.: 342,821

[22] Filed: Jan. 26, 1982

[30] Foreign Application Priority Data

Feb. 5, 1981 [FR] France .................. 81 02219

[51] Int. Cl.³ ............................................ G02F 1/133
[52] U.S. Cl. ...................... 350/333; 350/334; 350/336
[58] Field of Search ............. 350/333–336, 350/356, 357; 340/785, 784

[56] References Cited

U.S. PATENT DOCUMENTS

| | | | |
|---|---|---|---|
| 3,459,355 | 8/1969 | Wilmer | 350/336 X |
| 3,848,247 | 11/1974 | Sherr | 350/333 X |
| 3,914,019 | 10/1975 | Byatt | 350/336 X |
| 3,982,239 | 9/1976 | Sherr | 350/333 X |
| 4,163,982 | 8/1979 | Domenico | 350/357 |
| 4,231,640 | 11/1980 | Funada et al. | 350/336 |
| 4,277,786 | 7/1982 | Waldron | 350/336 X |
| 4,449,125 | 5/1984 | Clerc et al. | 350/333 X |

FOREIGN PATENT DOCUMENTS 2141826 3/1973 Fed. Rep. of Germany .
2279123 2/1976 France .

*Primary Examiner*—John K. Corbin
*Assistant Examiner*—David Lewis
*Attorney, Agent, or Firm*—Handal & Morofsky

[57] ABSTRACT

The invention relates to a matrix display device with a plurality of sets of electrodes as well as to the process for controlling the same.

The device comprises two insulating walls and by a material having a plurality of zones distributed in matrix-like manner and inserted between a first system of electrodes covering one of the two walls and defining p control columns and a second system of electrodes covering the other wall, constituted by parallel conductive strips, and defining q control lines, the column $x_i$ in which i is an integer such that $1 \leq i \leq p$ and row $y_j$ in which j is an integer such that $1 \leq j \leq q$ defining a zone $x_i y_j$ of the material. The first system is constituted by a solid layer of electrodes and n sets of electrodes, which are electrically insulated from one another. The electrodes of this system being grouped in such a way that each group of electrodes corresponds to a single control row.

13 Claims, 1 Drawing Figure

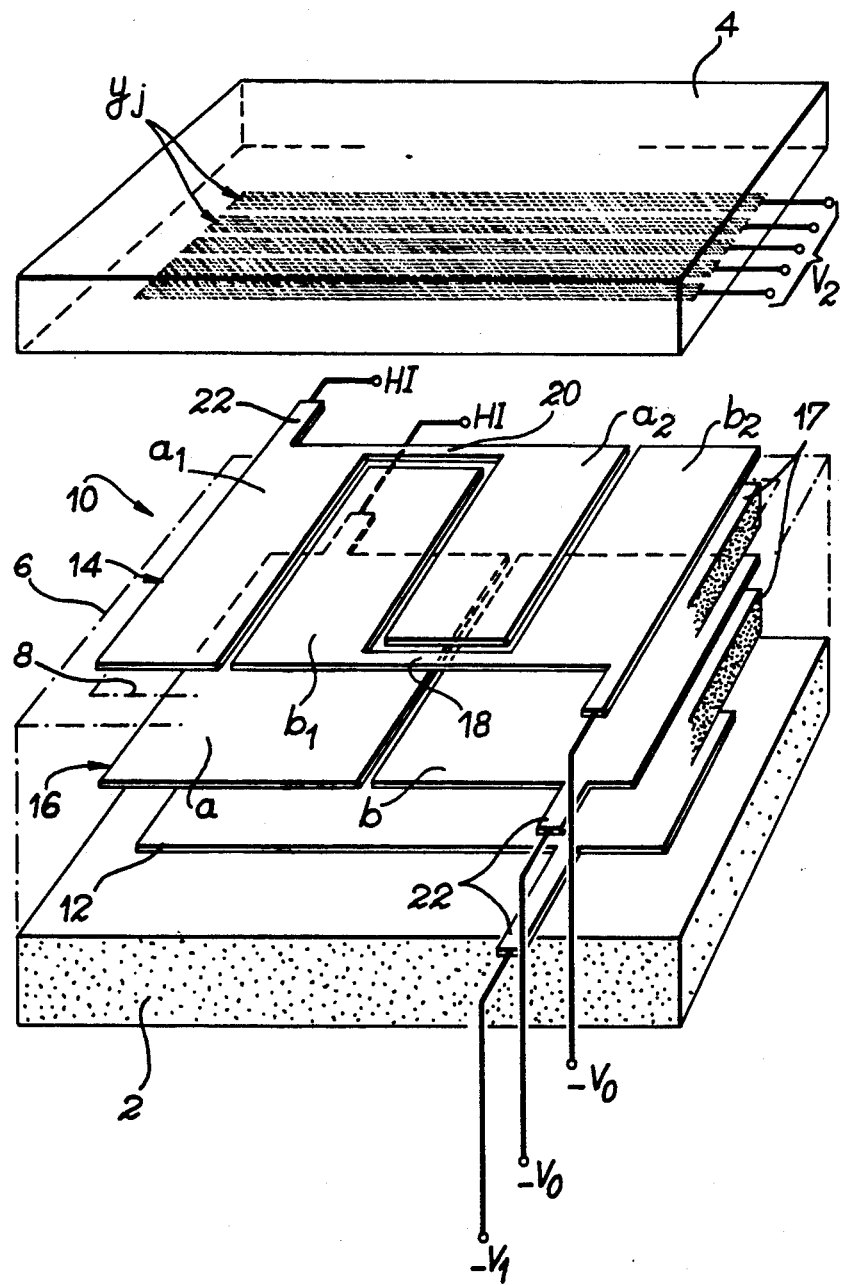

MATRIX DISPLAY DEVICE WITH MULTIPLE SCREEN ELECTRODES

BACKGROUND OF THE INVENTION

The present invention relates to a matrix display device having several sets of electrodes and to the process for controlling the same. It is used in opto-electronics and mainly in the control of the liquid crystal cells used more particularly as converters for converting electrical data into optical data, in the real time processing of optical images, in the production of colour filters which can be particularly used in colour television, and in analog display means.

More specifically, the invention relates to a matrix display device comprising a display cell constituted by two transparent insulating walls and by a material having a plurality of zones distributed in matrix-like manner and inserted between a first system of electrodes covering one of the two walls and defining p control columns and a second system of electrodes covering the other wall, constituted by parallel conductive strips and defining q control rows, the column $x_i$ in which i is an integer such that $1 \leq i \leq p$ and row $y_j$ in which j is an integer such that $1 \leq j \leq p$ defining an area $x_i y_j$ of the material and comprising means making it possible to supply appropriate excitation signals to the rows and columns for exciting an optical property of the material.

Numerous devices of this type are known and use, for example, as the sensitive material a liquid crystal film and for which the excitation is of an electrical nature. Although the invention more particularly applies to such devices, it also applies in more general terms to any device comprising a material of which an optical property can be modified by means of a random excitation. This excitation can be of an electrical type, such as for liquid crystals, but also of a magnetic, thermal, electronic or other type. The material can be a solid, liquid, amorphous or crystalline body. The optical property can be an opacity, refractive index, transparency, absorption, diffusion, diffraction, convergence, rotary power, birefringence, reflected intensity in a given solid angle, etc.

In the case of a liquid crystal cell in which the excitation is of an electrical type, such known display devices are controlled by applying a periodic voltage $V_x$ of mean value zero to row $x_i$ and a zero voltage to the other rows, whilst applying to the columns $y_j$ periodic voltages $V_{yj}$ of mean value zero of the same duration and frequency as the voltage $V_x$, but phase-displaced with respect to the latter by a quantity $\phi_{ji}$. This phase displacement $\phi_{ji}$ makes it possible to vary the intensity of the signal to be displaced, i.e. different grey levels can be obtained.

Such a control process is described in French Pat. No. 2,279,123, filed on Feb. 6th 1974 by the present Applicant and entitled "Process for the control of an optical characteristic of a material and analog imager utilizing the process".

A binary display is obviously obtained by applying the same scanning voltages $V_x$ to rows $x_i$ and by applying to the columns $y_j$ voltages $V_{yj}$ of the same duration and frequency $V_x$, either in phase or in phase opposition with respect to $V_x$, depending on whether a white or a black is to be displayed. In both cases, it is necessary to have the same number of row control circuits as there are rows.

BRIEF SUMMARY OF THE INVENTION

The present invention relates to a display device having a plurality of sets of electrodes, as well as to the process for controlling the same making it possible to limit and simplify the number of control circuits in the device.

Therefore, the present invention specifically relates to a matrix display device comprising a display cell constituted by two transparent insulating walls, and a material having a plurality of zones distributed in matrix-like manner inserted between a first system of electrodes covering one of the two walls and defining p control columns and a second system of electrodes covering the other wall, constituted by parallel conductive strips, and defining q control rows, column $x_i$ in which i is an integer such that $1 \leq i \leq p$ and row $y_j$ in which j is an integer such that $1 \leq j \leq p$ defining a zone $x_i y_j$ of the material, and comprising means making it possible to supply appropriate excitation signals to the rows and columns, said material having an optical property dependent on the said excitation, wherein the first system of electrodes is constituted by a solid layer electrode placed directly on the corresponding insulating wall and n sets of electrodes arranged and grouped in such a way that each set has a certain number of groups and wherein the choice of a group from each set corresponds to a single control column, the end n sets of electrodes placed one above the other and above the solid layer electrode being electrically insulated from one another and from the solid layer electrode.

According to a preferred embodiment of the display device according to the invention, the n sets of electrodes are in each case constituted by two electrode assemblies, each of which is constituted by $p/2^k$ electrodes in which k is an integer such that $1 \leq k \leq n$, the number of electrodes in each of these sets being different.

According to a preferred embodiment of the display device according to the invention, the $p/2^k$ electrodes of the kth set are electrically interconnected in pairs, the electrodes of one and the same assembly being electrically interconnected.

According to a preferred embodiment of the display device according to the invention, the material is a liquid crystal film, whose optical property is dependent on the electrical field applied thereto, the excitation signals being electrical voltages.

The present invention also relates to a process for controlling a matrix display device as defined hereinbefore. This process is characterized in that for controlling the optical property of the material of zone $x_i y_j$ a potential $=V_1$ is applied to the solid layer electrode, whilst a potential $-V_0$ is applied to all the groups of electrodes with the exception of that corresponding to column $x_i$, said group being placed under a high impedance and a potential $V_2$ is applied to row $y_j$ such that the voltage $V_2 + V_1$ corresponds to the desired value for the optical property of the material in zone $x_i y_j$.

According to a variant of the process according to the invention, the q zones of the same column $x_i$ are simultaneously controlled by simultaneously applying potential $V_2$ to each row.

DESCRIPTION OF THE DRAWING AND PREFERRED EMBODIMENTS

The features and advantages of the present invention will become more readily apparent from the following description of non-limitative exemplified embodiments. For reasons of clarity, the description refers to a display device, whose material is constituted by a liquid crystal film, whose optical property is dependent on the electrical field applied thereto. As stated hereinbefore, the invention has a much more general application, but at present these display devices are well known and widely used, so that the description more specifically relates thereto. The single drawing diagrammatically shows a matrix display device according to the invention.

The drawing diamgrammatically shows a display cell having two parallel and generally transparent insulating walls 2 and 4, which can be in the form of glass walls arranged on either side of an insulating material shim 6 defining a volume 8 which, when the cell is fitted, is occupied by the material of which an optical property is controlled, e.g. a liquid crystal film. A first system of electrodes 10 defining p columns for controlling the optical property of the display material is placed on insulating wall 2 and a second system of electrodes constituted by transparent, parallel conductive strips $y_j$ and defining q lines for controlling said optical property is placed on insulating wall 4. These two systems of electrodes can be formed from indium oxide.

To make it easier to see the various elements constituting the first system of electrodes 10, the dimensions and in particular the thickness of the said system have not been respected.

According to the invention, the first system of electrodes 10 comprises a solid layer electrode 12 placed directly on insulating wall 2 and n sets of electrodes such as 14 and 16, in which n is an integer such that $2^n = p$, p being the number of control columns. The n sets of electrodes are in each case constituted by two electrode assemblies a and b. The electrodes are grouped in such a way that the choice of one assembly in each set corresponds to a single column for controlling the optical property of the display material. The grouping of the electrodes will be described hereinafter. The n sets of electrodes are placed one above the other and above the solid layer electrode 12. These n set of electrodes are electrically insulated from one another and from the solid layer electrode by means of insulating layers such as 17 inserted between each set and said electrode 12.

Each electrode assembly a or b of the kth set of electrodes comprises $p/2^k$ electrodes, k being an integer such that $1 \leq k \leq n$ and p the number of control columns of the display device. The drawing only shows two sets of electrodes, i.e. n is equal to 2. The set designated as 14 corresponds to k equal to 1 and the set designated 16 to k equal to 2. The use of two sets of electrodes corresponding to four control columns leads to assembly a or b of set 14 having two electrodes $a_1$ and $a_2$ or $b_1$ and $b_2$ and to assembly a or b of set 16 having one electrode a or b. In the embodiment shown in the drawing, the two sets of electrodes are arranged in accordance with decreasing values of integer k.

Preferably, the electrodes of one and the same assembly are electrically interconnected by connections such as 18 and 20. Therefore, for example, for the set of electrodes 14 constituted by four electrodes $a_1$, $a_2$, $b_1$, $b_2$, electrode $b_1$ is inserted between electrode $a_1$ and electrode $a_2$ and opposite connection 20 connecting electrodes $a_1$ and $a_2$, whilst electrode $a_2$ is inserted between electrodes $b_1$ and $b_2$ opposite connection 18 connecting said electrodes $b_1$ and $b_2$.

It should be noted that the number of electrodes in the set of electrodes $k = 1$ is equal to the number of columns controlling the optical property of the display material (i.e. two assemblies comprising in each case p/2 electrodes).

Thus, the useful surface of the liquid crystal is broken down into a mosaic of zones corresponding to the overlap or covering zones of the two systems of electrodes, each zone corresponding to the overlap of one electrode of the set $k = 1$ and of one row electrode $y_j$. The electrodes of n sets of electrodes facing an electrode of set $k = 1$ define a group of electrodes, designated $x_i$ corresponding to the control column. The liquid crystal zone between row electrode $y_j$ and the group of electrodes $x_i$ can be designated $x_iy_j$.

The excitation of a zone $x_iy_j$, i.e. the control of an optical property of the liquid crystal contained therein, takes place by applying to the groups of electrodes $x_i$ and to row electrodes $y_j$ potentials supplied by not shown electric power sources leading to the appearance of an electrical field within the liquid crystal. This also leads to the appearance of an image on the complete cell by the pointwise definition thereof and by successively exciting the zones according to the principles known from sequential control technology.

In a display device using a liquid crystal cell, e.g. of the nematic type, the phenomenon used is the collective orientation of the molecules of said crystal parallel to the electrodes, when the crystal is exposed to an electrical field. The phenomenon used in such a device is described in the aforementioned French Pat. No. 2,279,123.

According to the invention, one zone $x_iy_j$ of the material is excited by applying a potential $V_2$ to row $y_j$ of the second system of electrodes and a potential $= V_1$ to the solid layer electrode 12. The group of electrodes $x_i$ is placed under high impedance, i.e. electrically insulated and the other groups are raised to a potential $-V_0$, such that $V_0$ is below $V_1$.

In practice, one of the two assemblies of each set of electrodes is raised to potential $-V_0$ and the other assembly is placed under high impedance. For example, the material facing electrode $a_1$ is excited by raising assembly b of sets of electrodes 14 and 16 to potential $-V_0$ and by placing assembly a of the two sets 14 and 16 under a high impedance, the solid layer electrode 12 being maintained at potential $-V_1$. The corresponding zone $x_iy_j$ of the liquid crystal has a voltage differing only slightly from $V_2 + V_1$ at its terminals, provided that the insulating layer 17 has a limited thickness compared with that of the liquid crystal and/or a dielectric constant well above that of the liquid crystal. This results from the continuity of the electrical field of the different electrodes of one and the same group. Moreover, in view of the fact that the liquid crystal used has a threshold effect, the voltage $V_2 + V_1$ must be well above the threshold voltage of the said crystal. In the same way, the other zones of the liquid crystal facing line $y_j$ have a voltage $V_2 + V_0$ at their terminals and this voltage must be below the threshold voltage of the liquid crystal.

In order to bring about the display of all the display zones corresponding to a column $x_i$, the potential $V_2$ corresponding to the value of the optical property which it is desired to display at the intersection point of each row electrode and column $x_i$ is applied simultaneously to each row electrode.

As the phenomenon used in such a display device is the collective orientation of the molecules by the action of an electrical field on their dipole moment, to prevent any disturbance in the liquid due more particularly to ion transits (polarization phenomenon), it is necessary to reverse the voltage applied at the terminals of the material, i.e. the potentials applied to the two systems of electrodes. This problem can be solved by using alternating voltages for controlling the optical property of the material.

The invention is not limited to crossed-band matrix displays. The invention also covers in a general manner any selective display using the following arrangements. It comprises an electrode covering the complete display, which is raised to a potential for controlling the optical appearance of the liquid crystal. A plurality of superimposed sets of screen electrodes is arranged between the control electrode and the liquid crystal. The said screen electrodes are arranged in such a way that a screen electrode combination chosen in each of the sets coincides with the particular zone to be excited. Each of the screen electrodes of this combination is insulated, whilst the other screen electrodes are raised to a fixed potential.

What is claimed is:

1. A matrix display device, comprising:
   (a) a first insulating wall;
   (b) a second transparent insulating wall disposed over said first wall in facing spaced relationship thereto;
   (c) a first system of electrodes covering one of the walls and defining p control columns, said first system of electrodes comprising:
      (i) a solid layer electrode disposed directly on the face of said one insulating wall facing the other insulating wall;
      (ii) n sets of electrodes where n is an integer greater than one, each of said sets of electrodes having a given number of groups, the selection of a group of each set corresponding to a single control column, said n sets of electrodes placed one above the other and above said solid layer electrode; and
      (iii) a plurality of insulative members disposed between said solid layer electrode and said sets of electrodes to electrically insulate said sets of electrodes from each other and from the solid layer electrode;
   (d) a second system of electrodes disposed on the face of said other wall facing said one of the walls, said second set of electrodes comprising a plurality of parallel conductor strips which define q control rows; one of the columns, column $x_i$, in which i is an integer defined by the relationship $1 \leq i \leq p$, and one of the rows, row $Y_j$, where j is defined by the relationship $1 \leq j \leq q$ define a zone $x_i y_j$ in the volume between said first and second systems of electrodes;
   (e) an opto-electronic material disposed between said first and second systems of electrodes having a plurality of zones distributed in a matrix-like manner, said material having optical properties which vary in response to an excitation signal above a threshold of said material; and
   (f) means for applying excitation signals to said first and second systems of electrodes to activate a row and a column corresponding to a zone $x_i y_j$ in said material which one desires to activate.

2. A display device according to claim 1, wherein said means for applying excitation signals comprises means for applying a potential $-V_1$ to the solid layer electrode and a potential $-V_0$ to all the groups of electrodes with the exception of that corresponding to column $x_i$, said group being placed under a high impedance, and means for applying to row $y_j$ a potential $V_2$ such that voltage $V_2 + V_1$ corresponds to the desired value of the optical property of the material in zone $x_i y_j$, $V_2 + V_1$ being above the threshold of said material and $V_2 + V_0$ being below said threshold.

3. A matrix display device according to claims 1 or 2, wherein the n sets of electrodes comprise two electrode assemblies, each assembly having $p/2^k$ electrodes, where k is an integer such that $1 \leq k \leq n$, each of the said sets having a different number of electrodes.

4. A matrix display device according to claim 3, wherein the n sets of electrodes are arranged in accordance with the decreasing values of the integer k defining them.

5. A matrix display device according to claim 4, wherein the $p/2^k$ electrodes of the kth set are electrically interconnected in pairs, the electrodes of one and the same assembly being electrically interconnected.

6. A matrix display device according to claim 1, wherein the systems of electrodes are made from a transparent conductive material.

7. A matrix display device according to claim 6, wherein the transparent conductive material is indium oxide.

8. A matrix display device according to claim 1, wherein the material is a liquid crystal film, whose optical property is dependent on the electrical field applied thereto, the excitations signals being electrical voltages.

9. A matrix display device according to any one of the claims 1, 2, 4, 5, 6, 7 or 8, wherein for controlling the optical property of the material of zone $x_i y_j$ a potential $-V_1$ is applied to the solid layer electrode, whilst a potential $-V_0$ is applied to all the groups of electrodes with the exception of that corresponding to column $x_i$, said group being placed under a high impedance and a potential $V_2$ is applied to row $y_j$ such that the voltage $V_2 + V_1$ corresponds to the desired value for the optical property of the material in zone $x_i y_j$.

10. A matrix display according to claim 9, wherein the q zones of the same column $x_i$ are simultaneously controlled by simultaneously applying potential $V_2$ to each row.

11. A cell having a controlable optical characteristic in a particular zone, comprising a combination of, a solid layer control electrode separated from a liquid crystal by a plurality of superimposed sets of electrodes of different configurations, said electrodes of different configurations being defined in such a way that a combination of electrodes of different configurations chosen in each of the superimposed sets coincides with said particular zone, each of the electrodes of different configurations of said combination being insulated and each of the other electrodes of different configurations being raised to a fixed potential.

12. A matrix display display device, comprising:
   (a) a first insulating wall;
   (b) a second transparent insulating wall disposed over said first wall in facing spaced relationship thereto;
   (c) a first system of electrodes covering one of the walls and defining p control columns, said first system of electrodes constituting:
      (i) a solid layer electrode disposed directly on the face of said one insulating wall facing the insulating wall;

(ii) n sets of electrodes where n is an integer greater than one, each of said sets of electrodes having a given number of groups, the selection of a group of each set corresponding to a single control column, said n sets of electrodes placed one above the other and above said solid layer electrode, wherein the n sets of electrodes are in each case constituted by two electrode assemblies, each assembly having $p/2^k$ electrodes, in which k is an integer such that $1 \leq k \leq n$, each of the said sets having a different number of electrodes, said $p/2^k$ electrodes of the kth set being electrically interconnected in pairs, the electrodes of each assembly being electrically interconnected;

(iii) a plurality of insulative members disposed between said solid layer electrode and said sets of electrodes to electrically insulate said sets of electrodes from each other and from the solid layer electrode;

(d) a second system for electrodes disposed on the face of said other wall facing said one of the walls, said second set of electrodes comprising a plurality of parallel conductor strips which define q control rows; one the columns, column $x_i$, in which i is an integer defined by the relationship $1 \leq i \leq p$, and one of the rows $y_j$, where j is defined by the relationship $1 \leq j \leq q$ define a zone $x_i y_j$ in the volume between said first and second systems of electrodes;

(e) an opto-electronic material disposed between said first and second systems of electrodes having a plurality of zones distributed in a matrix-like manner, said material having optical properties which vary in response to an excitation signal above a threshold of said material; and (f) means for applying excitation signals to said first and second systems of electrodes to activate a row and a column corresponding to a zone $x_i y_j$ in said material which one desires to activate.

13. A controllable matrix display device, comprising:
(a) a first insulating wall;
(b) a second transparent insulating wall disposed over said first wall in facing spaced relationship thereto;
(c) a first system of electrodes covering one of the walls and defining p control columns, said first system of electrodes comprising:

(i) a solid layer electrode disposed directly on the face of said one insulating wall facing the other insulating wall;

(ii) n sets of electrodes where n is an integer greater than one, each of said sets of electrodes having a given number of groups, the selection of a group of each set corresponding to a single control column, said n sets of electrodes have different configurations and are placed one above the other and above said solid layer electrode; and (iii) a plurality of insulative members disposed between said solid layer electrode and said sets of electrodes to electrically insulate said sets of electrodes from each other and from the solid layer electrode;

(d) a second system of electrodes disposed on the face of said other wall facing said one of the walls, said second set of electrodes comprising a plurality of parallel conductor strips which define q control rows; one of the columns, column $x_i$, in which i is an integer defined by the relationship $1 \leq i \leq p$, and one of the rows, row $y_j$, where j is defined by the relationship $1 \leq j \leq q$ define a zone $x_i y_j$ in the volume between said first and second systems of electrodes;

(e) an opto-electronic material disposed between said first and second systems of electrodes having a plurality of zones distributed in a matrix-like manner, said material having optical properties which vary in response to an excitation signal above threshold of said material; and (f) means for applying excitation signals to said first and second systems of electrodes to activate a row and a column corresponding to a zone $x_i y_j$ in said material which one desires to activate.

* * * * *